(12) United States Patent
Koike

(10) Patent No.: US 6,586,515 B1
(45) Date of Patent: Jul. 1, 2003

(54) NON-BIREFRINGENT OPTICAL RESIN MATERIAL

(76) Inventor: Yasuhiro Koike, 534-23, Ichigao-cho, Aoba-ku, Yokohama-shi, Kanagawa 225-0024 (JP)

( * ) Notice: Subject to any disclaimer, the term of this patent is extended or adjusted under 35 U.S.C. 154(b) by 0 days.

(21) Appl. No.: 09/857,463

(22) PCT Filed: Oct. 3, 2000

(86) PCT No.: PCT/JP00/06880
§ 371 (c)(1),
(2), (4) Date: Jun. 5, 2001

(87) PCT Pub. No.: WO01/25364
PCT Pub. Date: Apr. 12, 2001

(30) Foreign Application Priority Data

Oct. 5, 1999 (JP) .......................... 11-283940

(51) Int. Cl.⁷ ................................. C08K 3/26
(52) U.S. Cl. ..................................... 524/425
(58) Field of Search ......................... 524/425

(56) References Cited

U.S. PATENT DOCUMENTS

| | | | | | |
|---|---|---|---|---|---|
| 3,975,203 A | * | 8/1976 | Dietz | ......................... | 106/299 |
| 3,996,189 A | * | 12/1976 | Travnicek | ..................... | 260/37 |
| 4,278,576 A | * | 7/1981 | Goldman | ..................... | 260/23 |
| 4,333,983 A | * | 6/1982 | Allen | ......................... | 428/336 |
| 4,546,036 A | * | 10/1985 | Renalls et al. | ............... | 428/323 |
| 5,173,811 A | * | 12/1992 | Gumbs | ......................... | 359/885 |
| 5,326,662 A | * | 7/1994 | Jugle | ......................... | 430/110 |
| 6,201,045 B1 | | 3/2001 | Koike | | |
| 6,322,860 B1 | * | 11/2001 | Stein et al. | ................. | 428/1.26 |

FOREIGN PATENT DOCUMENTS

| | | |
|---|---|---|
| EP | 740168 | 10/1996 |
| JP | 10-109950 | 4/1998 |
| JP | 11-293116 | 10/1999 |
| JP | 2000-313816 | 11/2000 |
| WO | 96/06370 | 2/1996 |

* cited by examiner

Primary Examiner—Edward J. Cain
(74) Attorney, Agent, or Firm—Wenderoth, Lind & Ponack, L.L.P.

(57) ABSTRACT

The birefringence that results from the orientation of high molecular weight resins is cancelled out and still they are provided with heat resistance. To attain this object, the invention provides an optical resin material comprising a transparent high molecular weight resin and a fine inorganic substance which, as the linked chains in the high molecular weight resin are oriented under an external force, is oriented in the same direction as the linked chains and which has birefringence, the birefringence of said inorganic substance cancelling out the birefringence in orientation of the oriented high molecular weight resin. The invention also provides a process for producing the optical resin material, as well as optical components, an adhesive, substrates for a liquid-crystal device, and polarizing plates for the device.

31 Claims, 6 Drawing Sheets

NON-BIREFRINGENT OPTICAL RESIN MATERIAL

This application is a 371 application of PCT/JP00/06880 filed Oct. 3, 2000.

TECHNICAL FIELD

This invention relates to optical resin materials, more particularly to non-birefringent optical resin materials that show substantially no birefringence or which show small enough birefringence to cause no adverse effects in practice, as well as applications of such non-birefringent optical resin materials.

BACKGROUND ART

Recently, high molecular weight resins are increasingly supplanting the conventional glass-based materials for use not only in general optical parts such as eyeglass lenses and transparent sheets but also in optoelectronic optical parts such as those to be used in laser-related equipment as exemplified by optical disk apparatus for recording acoustic, video, character and other information. This is because optical materials made of high molecular weight resins, namely, optical resin materials, are generally better suited to efficient processing and high-volume production than glass-based optical materials since they are lighter in weight, have higher impact resistance and allow for easier application of molding techniques such as injection molding and extrusion molding.

These characteristics are of course useful for the various kinds of optical parts mentioned above; in addition, they are even more useful when optical resin materials are used in various members that compose the liquid-crystal device as the principal component of a liquid-crystal display. Liquid-crystal displays have come to be used extensively as the display element of various electronic equipment. As their use has expanded, liquid-crystal displays are increasingly required to be lighter and thinner, with the added need for improvements in strength performance such as higher impact resistance. These requirements can be met by effective utilization of those characteristics possessed by high molecular weight resin materials.

Thus, optical resin materials have the potential to show excellent characteristics as optical parts and they are expected to find extensive use in optical parts. In fact, however, they have not been used as much as expected. This is primarily because the products manufactured by applying the aforementioned molding techniques to optical resin materials show by no means small birefringence which sometimes impairs the functions of optical parts in which they are used.

The occurrence of birefringence in high molecular weight resin materials is widely known per se, inclusive of its cause. To be more specific, for almost all high molecular weight resin materials that are commonly used as optical materials, the monomers of which they are formed have optical anisotropy in refractive index and if the polymer is oriented or shows alignment in a given direction, this optical anisotropy of the monomers is expressed to develop birefringence in the high molecular weight resin material. More specifically, the following phenomena take place.

The polymer as produced by polymerization reaction has the linked chains intertwined randomly, i.e., the linked chains of the polymer are not oriented. In this state, the optical anisotropy of one monomer unit cancels that of another monomer unit and the polymer shows no birefringence. However, upon molding such as injection molding or extrusion molding, an external force is applied and the random linked chains in the polymer become oriented, causing the polymer to show birefringence. This state is shown schematically in FIG. 1. As shown, the high molecular weight resin material that has undergone the molding process accompanied by an external force is in such a state that a number of units (monomers) 1 which form the linked chains in the polymer are linked spatially in a specified direction of orientation. And as already mentioned, for almost all high molecular weight resin materials that are commonly used as optical materials, every unit 1 has optical anisotropy in refractive index. In other words, the refractive index $n_{pr}$ for a polarized wave component travelling in a direction parallel to that of orientation is different from the refractive index $n_{vt}$ for a polarized wave component in a direction vertical to that of orientation.

As is well known, this optical anisotropy can be expressed by the index ellipsoid. Referring to FIG. 1, each linked unit 1 has an elliptic mark 2 which represents the index ellipsoid. Take, for example, polymethyl methacrylate (PMMA); the refractive index of each unit (methyl methacrylate) 1 is relatively small in the direction of orientation and relatively large in a direction vertical to it. Therefore, the index ellipsoid as viewed at a macroscopic scale is oblong in the vertical direction as indicated by 3 in FIG. 1. In other words, $n_{pr}$ is smaller than $n_{vt}$ with polymethyl methacrylate. The difference obtained by subtracting $n_{vt}$ from $n_{pr}$ ($\Delta n = n_{pr} - n_{vt}$) is called the value of birefringence in orientation. The following Table 1 lists the values of intrinsic birefringence for typical optical resin materials.

TABLE 1

Intrinsic Birefringence Values of Typical High Molecular Weight Resins

| Resin name | Birefringence value; $\Delta n = n_{pr} - n_{vt}$ |
|---|---|
| Polystyrene | −0.100 |
| Polphenylene oxide | +0.210 |
| Polycarbonate | +0.106 |
| Polyvinyl chloride | +0.027 |
| Polymethyl methacrylate | −0.0043 |
| Polyethylene terephthalate | +0.105 |
| Polyethylene | +0.044 |

The value of intrinsic birefringence is the value of birefringence exhibited by any one of these polymers when they are fully oriented in a certain direction. In fact, depending on the degree of its orientation, the polymer assumes a value between zero and the intrinsic birefringence.

For example, the polymethyl methacrylate shown in FIG. 1 has $\Delta n$ between −0.043 and 0, and polystyrene has $\Delta n$ between −0.100 and 0. With polyethylene, $\Delta n$ has a positive value between 0 and +0.044. Hereinafter, if the sign of $\Delta n$ is positive ($\Delta n > 0$), the expression "the sign of birefringence is positive" is to be used and if the sign of $\Delta n$ is negative ($\Delta n < 0$), the expression "the sign of birefringence is negative" is to be used.

The birefringence in orientation is particularly problematic in applications where polarization characteristics are important. A typical example of such applications is a group of optical parts in the recently developed write/erasable magnetooptical disk. The write/erasable magnetooptical disk uses polarized beams as reading or writing beams, so if birefringent optical elements (e.g. the disk per se or lenses) are within the optical path, the precision in reading or writing is adversely affected.

An application where the birefringence in the members used plays a more important role is a liquid-crystal device. As is well known, the liquid-crystal device consists of a liquid-crystal layer sandwiched between a polarizer and an analyzer that form crossed or parallel Nicols and the liquid-crystal layer switches between the transmission and non-transmission of light by rotating the plane of polarization of polarized light. Hence, the birefringence of the members which compose the liquid-crystal device poses a great problem which prevents extensive application of optical resin materials to the liquid-crystal device.

With a view to eliminating this problem of birefringence in orientation, various proposals have heretofore been made. A typical example is disclosed in commonly assigned PCT/JP95/01635 (International Publication WO96/06370). According to this technique, a matrix made of a transparent high molecular weight resin is mixed with a low molecular weight organic substance that can be oriented in the same direction as the linked chains in the matrix forming high molecular weight resin are oriented under an external force and the birefringence in orientation of the high molecular weight resin is cancelled out by the birefringence of the low molecular weight organic substance to produce a non-birefringent optical resin material.

To be more specific, the matrix forming high molecular weight resin has birefringence in orientation whose sign is positive or negative and the low molecular weight organic substance added to it exhibits birefringence of opposite sign, whereby the two values of birefringence cancel each other to provide high degree of non-birefringence. If this non-birefringent optical resin material is subject to stress or other external action as during molding, the linked chains in the high molecular weight resin are oriented and the added low molecular weight organic substance is accordingly oriented. The major axes of the index ellipsoids in the oriented low molecular weight organic substance cross the major axes of the index ellipsoids in the high molecular weight resin at right angles and the birefringence in orientation of the overall system is either substantially eliminated or reduced to such a level that it can be regarded as having no birefringence.

This technique has many advantages. For example, the birefringence of the high molecular weight resin can be reduced to almost zero by simply adjusting the loading of the low molecular weight organic substance in accordance with the types of the two components. The low molecular weight organic substance is not substantially involved in the polymerization reaction of the matrix forming high molecular weight resin (i.e., it has no reactivity with the monomer from which the high molecular weight resin is formed) and, hence, there are few limitations on the combination of the high molecular weight resin and the low molecular weight organic substance. In other words, there is high degree of freedom in the choice of the high molecular weight resin. The low molecular weight organic substance generally has greater optical anisotropy in refractive index than the individual unit molecules in the high molecular weight resin; hence, it need be added in comparatively small amounts and the characteristics of the matrix forming high molecular weight resin can be utilized more effectively in the optical resin material. There is no need for design consideration that can prevent the polymer from being oriented and molding technologies such as injection molding and extrusion molding that feature high processing rate and productivity can be freely applied to process the polymer.

Even this salient technique has one major drawback that cannot be neglected in certain applications of the produced optical resin material. The problem arises from the use of the low molecular weight organic compound as the substance to cancel out the birefringence in orientation of the polymer and it is a drop in heat resistance. The low molecular weight organic compound to be added always has varying degrees of plasticizing effect on the matrix forming high molecular weight resin and its glass transition temperature is lowered accordingly. The plasticizing effect of the low molecular weight substance is an advantage to materials that need be given softness by the plasticizer but it is a serious drawback in applications where a certain minimum level of heat resistance is required.

The present invention has been accomplished under these circumstances and has as an object providing a technology that can solve the aforementioned problem of heat resistance in the prior art. More specifically, the invention aims at providing a technology that retains the various advantages of the prior art and which yet can solve the problem of decreased heat resistance.

DISCLOSURE OF THE INVENTION

To attain these objects, the present invention provides, according to one aspect, an optical resin material comprising a transparent high molecular weight resin and a fine inorganic substance which, as the linked chains in the high molecular weight resin are oriented under an external force, is oriented in the same direction as the linked chains and which has birefringence, the birefringence of said inorganic substance cancelling out the birefringence in orientation of the oriented high molecular weight resin.

The term "cancelling out the birefringence in orientation" as used herein means bringing the birefringence in orientation close enough to zero. To be more specific, if the high molecular weight resin of interest has a positive birefringence in orientation, it is "cancelled out" by being decreased toward zero; if the resin has a negative birefringence in orientation, it is "cancelled out" by being increased toward zero. The term also means reducing the absolute value of the birefringence in orientation. The birefringence in orientation need not necessarily be brought to zero but may be brought close enough to zero that there will be no adverse effects in practice.

The present invention is based on the idea disclosed in International Publication WO96/06370 but differs from the prior art in that it is characterized by adding an inorganic substance. The inorganic substance used in the invention is substantially free from the plasticizing effect due to the bearing effect which inevitably occurs in low molecular weight substances or low molecular weight organic compounds. It hence has the advantage of not impairing the intrinsic heat resistance of the high molecular weight resin.

Minerals are typical examples of the inorganic substance and as is observed in their crystals, the inorganic substance in many cases has much greater birefringence than organic compounds. Within the crystals, the constituent atoms have an orderly steric arrangement and in birefringent crystals the arrangement is anisotropic. In polymers, birefringence does not occur before they are drawn or otherwise oriented but this is not the case with crystals and they show birefringence on account of their inherent crystal structures. When light travels through a birefringent crystal, it branches in two waves having orthogonally crossed planes of polarization and there is a direction in which the crystal has the same refractive index for the two waves. The axis parallel to this direction is commonly called the optical axis. An index ellipsoid can be defined for the crystal with this optical axis taken as one of the principal axes. The difference between the refractive indices along the major and minor axes of the index ellipsoid gives the value of birefringence in the birefringent crystal. To give a few examples, calcite ($CaCO_3$) has a birefringent value of −0.17, rutile ($TiO_2$) +0.287, magnesite ($MgCO_3$) −0.191, smithonite ($ZnCO_3$) −0.227, rhodocrocsite ($MnCO_3$) −0.219, and cobalt calcite ($CoCO_3$) −0.255. These values of birefringence are greater than those of organic compounds by at least one order of magnitude. Hence, using inorganic substances as the additive offers an added advantage in that they need be added in extremely small amounts to give the required non-birefringence.

The inorganic substance has preferably a crystal structure in the class of tetragonal, trigonal, hexagonal, orthorhombic, monoclinic and triclinic systems. In addition to these single crystal structures, polycrystals or aggregates of such single crystals may be used since those structures also cause birefringence.

The inorganic substance is not limited to minerals and ceramics can also be used. Ceramics are preferably crystalline. However, sinters comprising a multitude of crystal particles can also be used as long as they show birefringence.

Addition of the inorganic substance to the high molecular weight resin often involves the problem of poor dispersibility. To solve this problem effectively, a binder having high dispersibility in the high molecular weight resin is chosen in consideration of the inorganic substance which is then subjected to a surface treatment with the binder.

In the present invention, the inorganic substance is used as fine particles. For several reasons such as the need to develop effective birefringence in the high molecular weight resin, it is usually preferred that the particle consist of acicular, rods (cylinders) or elongated plates shaped particles. The particle size has an upper limit that is associated with the scattering of light, hence, the wavelength of light (which is to be transmitted through the optical resin material). Generally, particles not larger than about the wavelength of light are more preferred but sizes up to about several times to several tens of times greater than the wavelength of light are tolerated in practice. In particular, when the optical resin material is used as a thin film, a certain degree of scattering is seldom problematic to the transparency needed in practice and the particle size may be a little more than 100 times the wavelength of light. As an example, consider acicular particles called "whiskers" that are used with visible light; the preferred thickness is not greater than a few microns, more preferably 1 $\mu$m and less, and most preferably 0.5 $\mu$m and less. The length is preferably not greater than several tens of microns, more preferably not greater than a few microns.

Scattering of light is closely related to the difference in refractive index between the inorganic substance and the high molecular weight resin. To be more specific, the greater the index difference between the inorganic substance and the high molecular weight resin, the higher the chance of scattering. According to the findings of the present inventor, no problems occurred in practice when the difference between the average refractive index of the inorganic substance and the refractive index of the high molecular weight resin was 0.5 or less, and the more preferred condition was 0.3 or less. The average refractive index of the inorganic substance means the average of the refractive indices of the inorganic substance in the two directions of its anisotropy in refractive index.

Chief examples of the high molecular weight resin that are commonly used as the optical resin material include polymethyl methacrylate (refractive index, n=1.49), polycarbonate (n=1.59) and norbornene based resins such as ARTON (product of JSR Co., Ltd.; n=1.51). These high molecular weight resins have refractive indices between about 1.5 and 1.6. Calcium carbonate ($CaCO_3$) is a typical example of inorganic substances, especially minerals, that have average refractive indices not differing from the refractive indices of these high molecular weight resins by 0.3 or less. Calcium carbonate has a great advantage in that shape-anisotropic fine particles which are particularly advantageous for the purposes of the invention can be obtained more easily than when other minerals are used. Hence, calcium carbonate is particularly preferred as the inorganic substance for the purposes of the invention.

In order for the added inorganic substance to cancel out the birefringence in orientation of the high molecular weight resin by its birefringent nature, the inorganic substance has to be oriented in such a way that the axial direction of the fine particles of which it is made becomes parallel to the linked chains in the high molecular weight resin as the latter are oriented. Orientation of the inorganic substance can typically be realized by an external molding force that causes the linked chains to be oriented in the high molecular weight resin. Such orientation occurs if the fine particles of the inorganic substance are in the form of elongated shapes such as a cylinder, a columnar, an acicular and an ellipsoid of revolution. The expression reading "oriented in such a way that the axial direction of the fine particles of which the inorganic substance is made becomes parallel to the linked chains in the high molecular weight resin as the latter are oriented" does not necessarily mean that all of the fine particles in the inorganic substance are oriented such that their axial direction is parallel to the linked chains in the high-molecular weight resin and it suffices that a statistically significant number of the fine particles in the inorganic substance are oriented such that their axial direction is parallel to the linked chains in the high molecular weight resin. The fine particles in any inorganic substance will do as long as their axial direction becomes oriented as the linked chains in the high molecular weight resin are oriented; preferably, the aspect ratio of the fine particles, or the ratio between the length in the axial direction and the diameter in a direction perpendicular to it is at least 1.5, more preferably at least 2, most preferably at least 3.

To produce the above-described optical resin material according to the invention, the inorganic substance may be mixed either prior to the start of polymerization reaction for synthesizing the transparent high molecular weight resin or after the start of the polymerization reaction but before it ends. To be more specific, the monomer as the source of the high molecular weight resin is mixed with the additive inorganic substance; after the inorganic substance is thoroughly dispersed, polymerization reaction is allowed to proceed until the optical resin material is obtained. In this polymerization process, the inorganic substance does not participate in the reaction for polymerization of the monomer for the same reason that the low molecular weight substance used in the above-described prior art does not.

There is another method that can be used to produce the optical resin material according to the invention; the high molecular weight resin material is heated to melt and the inorganic substance is added to the melt, followed by kneading the mixture to disperse the inorganic substance in the matrix. The material thoroughly kneaded by this method is preferably pelletized by a suitable means in preparation for processing into the final product. The pellets of the kneaded product are injection, extrusion or otherwise molded by ordinary techniques into the desired shape.

The main thrust of this method is that the high molecular weight resin material which has been heated to a molten state is mixed with the inorganic substance that will cancel out the birefringence in orientation of the resin material. As long as the kneading step is included, the obtained optical resin material will exhibit high degree of non-birefringence irrespective of the preceding or subsequent molding method that is employed.

The above-described method in which the inorganic substance that cancels out the birefringence in orientation is added to the molten high molecular weight resin material and the mixture is kneaded may be replaced by a process in which the high molecular weight resin material is dissolved in a suitable solvent and the inorganic substance that cancels out the birefringence in orientation is added to the solution which is uniformly kneaded and subsequently deprived of the solvent by evaporation or other method. The composition thus obtained is injection or extrusion molded into the desired shape, thereby producing the non-birefringent optical resin material.

Having the various characteristics described above, the optical resin material according to the invention can be utilized in various optical components, as well as in equipment that needs them. The optical resin material according to the invention finds particular utility as members of liquid-crystal devices. A typical example is the substrate of a liquid-crystal device placed between the liquid-crystal layer and the polarizing plate. If the substrate is formed of the optical resin material according to the invention, the aforementioned advantages of the optical resin material over the glass-based optical material can be effectively used to improve the various performance parameters of the liquid-crystal device.

The polarizing plate of the liquid-crystal device is formed by joining a transparent resin sheet to both sides of the polarizer. Applying the optical resin material of the invention to the transparent resin sheet is another advantageous method of use and the various performance parameters of the liquid-crystal device can be improved as in the case just described above.

The optical resin material according to the invention may also be used as an adhesive for permanent fixing to bond various elements of the liquid-crystal device and this is another preferred method for effectively using the high degree of non-birefringence of the resin material and the high degree of its freedom in the choice of suitable materials. With the conventional liquid-crystal device, there have been no resin materials adapted to use adhesives for permanent fixing having high degree of non-birefringence; therefore, excepting cases such as a monochromatic type where very high degree of birefringence is not required, various elements of the liquid-crystal device have been joined together by adhesives for removable fixing. If such adhesives for removable fixing are replaced by adhesives for permanent fixing that make use of the optical resin material according to the invention, the performance of the liquid-crystal device can be improved in various aspects such as endurance and heat resistance.

BEST MODE FOR CARRYING OUT THE INVENTION

Figure 1:
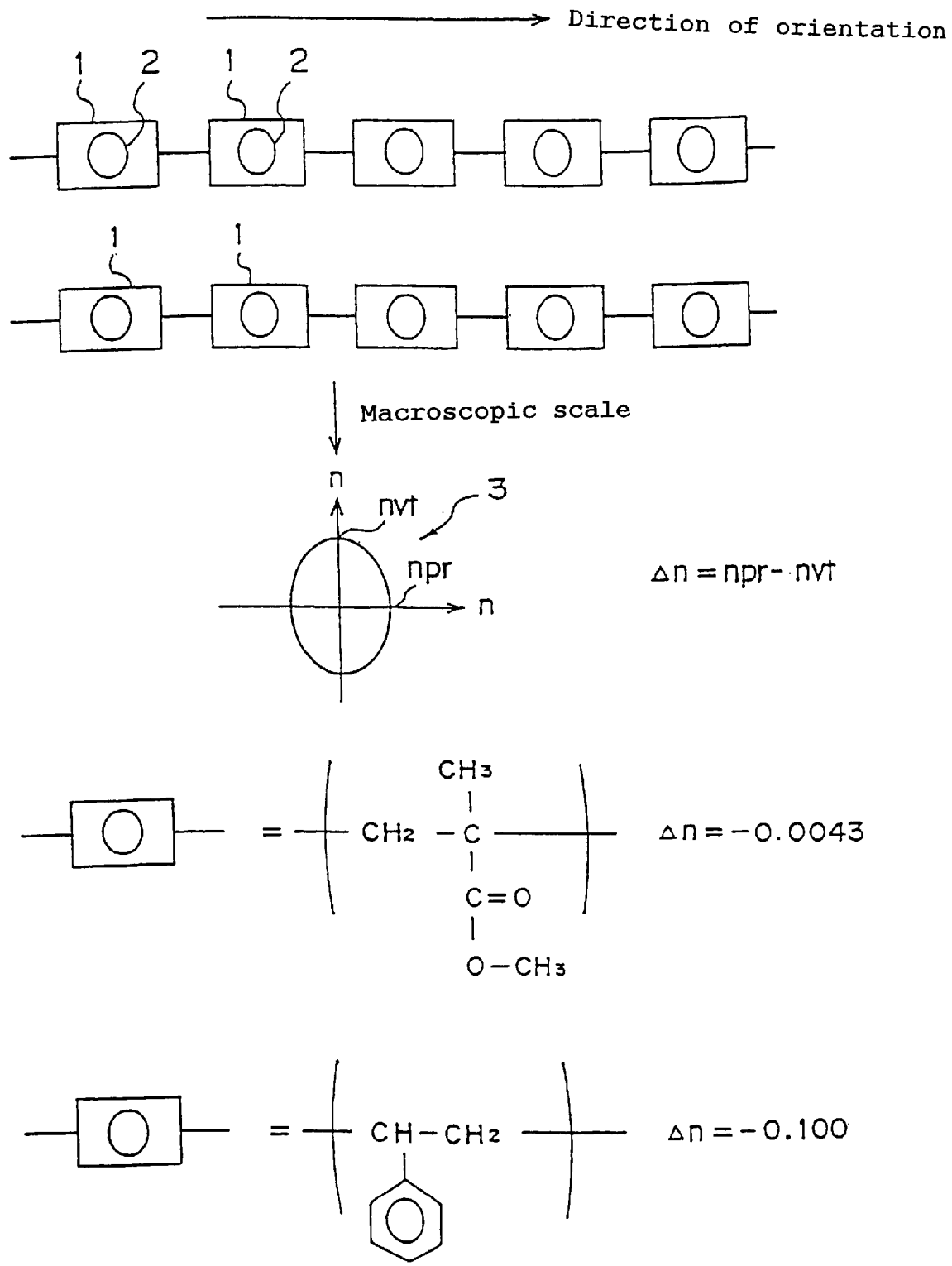
FIG. 1 is a schematic view illustrating how birefringence develops in a high molecular weight resin as the linked chains are oriented, in which reference numeral 1 designates a monomer unit, 2 the index ellipsoid for the monomer unit, and 3 the index ellipsoid at a macroscopic scale.

As described above, the high molecular weight resin that can be used in carrying out the invention is not subject to limiting conditions such as the ratio of reactivity and to the extent of its general aptness as an optical resin material as exemplified by transparency, the high molecular weight resin suffices for the purposes of the invention and there are no particular requirements to meet. Therefore, the degree of freedom in the choice of the high molecular weight resin material is extremely high and a suitable material can be selected not only from the species listed above in Table 1; considering its general aptness as the optical resin material, as well as heat resistance, mechanical strength, etc. in accordance with use, a suitable material can also be chosen from a wide range of materials including norbornene-based resins (e.g. ARTON of JSR and ZEONOA and ZEONEX of Nippon Zeon Co., Ltd.), polyallylate, polyether sulfone, polyethylene naphthalate, polymethylpentene-1, as well as alicyclic polyolefins (e.g. dicyclopentadienic polyolefins and norbornene-based polyolefins), and even copolymers of alicyclic(meth)acrylates (e.g. tricyclodecanyl methacrylate, cyclohexyl methacrylate and isobornyl methacrylate) and (meth)acrylates such as methyl methacrylate (MMA).

The inorganic substance to be used in the practice of the invention can also be selected from a wide range of materials. For example, in addition to acicular crystalline minerals, various other minerals can be used. However, the choice from these inorganic substances must satisfy a certain condition relating to the high molecular weight resin. As will be clear from the foregoing discussion, this condition is that the inorganic substances should have sufficient birefringence to cancel out the birefringence in orientation of the high molecular weight resin. If the birefringence in orientation of the high molecular weight resin is positive, one should choose the fine particles of an inorganic substance that shows negative birefringence. If the birefringence in orientation of the high molecular weight resin is negative, the fine particles of an inorganic substance that shows positive birefringence should be chosen. The birefringence exhibited by the inorganic substance is determined with respect to the direction of the aforementioned fine particles of a elongated shape. If the elongated shape is compared to an elongated cylinder, "the fine particles of an inorganic substance that shows positive birefringence" are such particles that the refractive index with respect to a polarized wave component in a direction parallel to the axis of the cylinder is greater than the refractive index with respect to a polarized wave component in a direction perpendicular to the axis of the cylinder, and "the fine particles of an inorganic substance that shows negative birefringence" are such particles that the refractive index with respect to a polarized wave component in a direction parallel to the axis of the cylinder is smaller than the refractive index with respect to a polarized wave component in a direction perpendicular to the axis of the cylinder.

As already mentioned, the fine particles in the oriented polymer have their axes of cylinders statistically aligned in the direction in which the polymer chains are oriented. The direction of the crystal and aggregation systems of the inorganic substances within the cylinders depends on the composition of their fine particles and the method of producing such particles. Take, for example, calcite ($CaCO_3$) which has a birefringent value of −0.17; the fine particles of this inorganic substance show positive or negative birefringence depending on whether the optical axes of its crystals are parallel or perpendicular to the axes of cylinders. In other words, an inorganic substance that shows a positive value of birefringence can produce not only "the fine particles of an inorganic substance that shows positive birefringence" but also "the fine particles of an inorganic substance that shows negative birefringence". Conversely, an inorganic substance that shows a negative value of birefringence can produce not only "the fine particles of an inorganic substance that shows negative birefringence" but also "the fine particles of an inorganic substance that shows positive birefringence".

The fine particles can assume various morphologies including single crystals, polycrystals and aggregations of these crystals and the statistical direction of the small constituent single crystals will determine the sign of birefringence exhibited by the fine particles. If the fine particles are polycrystals of calcite or aggregates of finer particles, the statistical direction of the small constituent single crystals will determine the sign of birefringence exhibited by the fine particles.

In a first preferred embodiment of the present invention, an inorganic substance is added to the monomer from which the high molecular weight resin is to be produced. The inorganic substance is subjected to a preliminary surface treatment with a binder that is highly dispersible in the matrix forming high molecular weight resin. The treatment with the binder may be performed as a step of the manufacturing process or, alternatively, binder-treated products may be purchased from suppliers who are specialized in this kind of processing. The added inorganic substance is fully dispersed and then a polymerization initiator and a chain transfer agent are added as appropriate; thereafter, energy is supplied by heat, irradiation with ultraviolet rays or by some other means to have the polymerization reaction proceed until the optical resin material is produced. As already mentioned, the inorganic substance does not take part in the reaction for polymerization of the monomer.

The types and quantities of the polymerization initiator and the chain transfer agent may be chosen by the same criteria as for the ordinary polymerization reactions. In the case of thermal polymerization, a peroxide such as benzoyl peroxide (BPO) may be used as the initiator. In the case of irradiation with ultraviolet (UV) rays, one may use benzoin methyl ether (BME) which is an initiator of UV-induced radical polymerization. In either case, normal butyl mercaptan (nBM) can be used as the chain transfer agent.

Consecutive polymerization in which the polymerization reaction is induced by the above-mentioned initiator is not the only method of mixing the monomer with the inorganic substance and it may be replaced by a method of inducing the polymerization reaction without using the initiator. In this alternative case, too, the inorganic substance can be in the reaction system without taking part in the polymerization. For example, even in step-reaction polymerization, ring-opening polymerization and ring-closing polymerization which are based on the reaction between radicals, the inorganic substance can be in the reaction system without taking part in the polymerization to give a non-birefringent high molecular weight resin material. Generally, the production process of the invention can be applied to any known processes of polymerization.

In a second preferred embodiment of the invention, the high molecular weight resin material is heated to melt and the inorganic substance is added to the melt, followed by kneading of the mixture to disperse the inorganic substance in the high molecular weight resin.

In a third preferred embodiment of the invention, the high molecular weight resin material is dissolved in a suitable solvent to form a solution and the inorganic substance is added to the solution, followed by kneading of the mixture to disperse the inorganic substance in the high molecular weight resin.

In the second and third embodiments, the mixing and kneading operations can be performed by known methods. Optical resin materials that are obtained by the methods described above may be processed into the final product via a series of continuous steps or, alternatively, they may be processed into pellets that are suitable for molding by injection, extrusion and any other conventional molding techniques.

Figure 2:
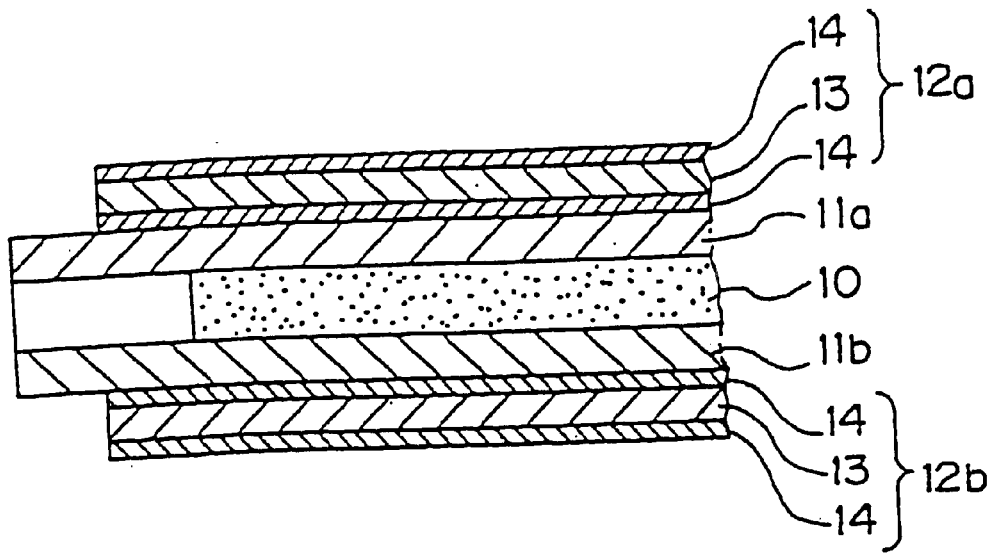
FIG. 2 is a cross section of an embodiment of a liquid-crystal device using the optical resin material according to the invention, in which reference numeral 10 designates a liquid-crystal layer, 11a and 11b each designate a substrate, 12a and 12b each designate a polarizing plate, and 14 a transparent resin sheet.

A fourth preferred embodiment of the invention relates to a liquid-crystal device in which the optical resin material according to the invention is used in several elements. An exemplary layout is shown in FIG. 2. In this embodiment, a liquid-crystal layer 10 is sandwiched between substrates 11a and 11b which are each formed of the optical resin material according to the invention; on the top and bottom of the device, polarizing plates 12a and 12b are provided and a transparent resin sheet 14 joined to both sides of a polarizer 13 in each polarizing plate is also formed of the optical resin material according to the invention; further, the substrates 11a and 11b are joined to the polarizing plates 12a and 12b, respectively, by means of an adhesive prepared from the optical resin material according to the present invention.

Figure 3:
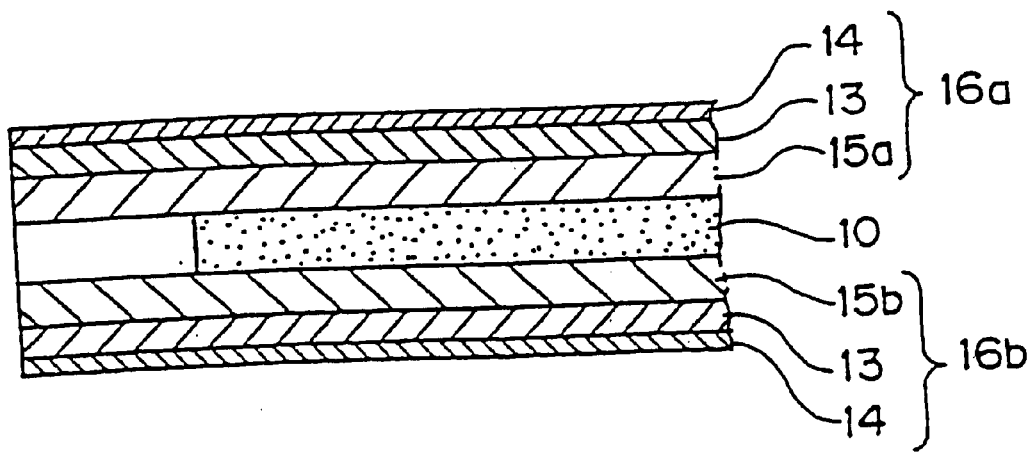
FIG. 3 is a cross section of another embodiment of the liquid-crystal device using the optical resin material according to the invention, in which reference numerals 15a and 15b each designate a substrate and 16a and 16b each designate a polarizing plate.

A fifth preferred embodiment of the invention also relates to a liquid-crystal device using the optical resin material according to the invention. As shown in FIG. 3, a major difference from the fourth embodiment is that each of the substrates 15a and 15b also serves as the transparent resin sheet 14 placed in contact with the liquid-crystal layer 10 so that the polarizing plates 16a and 16b are structurally integral with the substrates 15a and 15b, respectively.

INDUSTRIAL APPLICABILITY

According to the present invention, the birefringence of optical resin materials can be removed without being bound by the limiting conditions inherent in the prior art methods. As a consequence, the latitude in the choice of a suitable feed for non-birefringent optical resin materials can be significantly increased and the optical and mechanical characteristics of the chosen feed can be fully exploited to enable cost-effective production of non-birefringent optical resin materials having improved optical and mechanical characteristics, in particular, high heat resistance. Further according to the invention, the manufactured optical resin materials can be used in various members to improve various performance parameters of equipment including optical elements, for example, liquid-crystal devices.

EXAMPLES

Example 1

This example is intended to show that positive birefringence in orientation of a resin can be cancelled out by adding particles (acicular crystals of calcium carbonate) having negative birefringence and drawing the mixture to orient the crystals.

Figure 4:
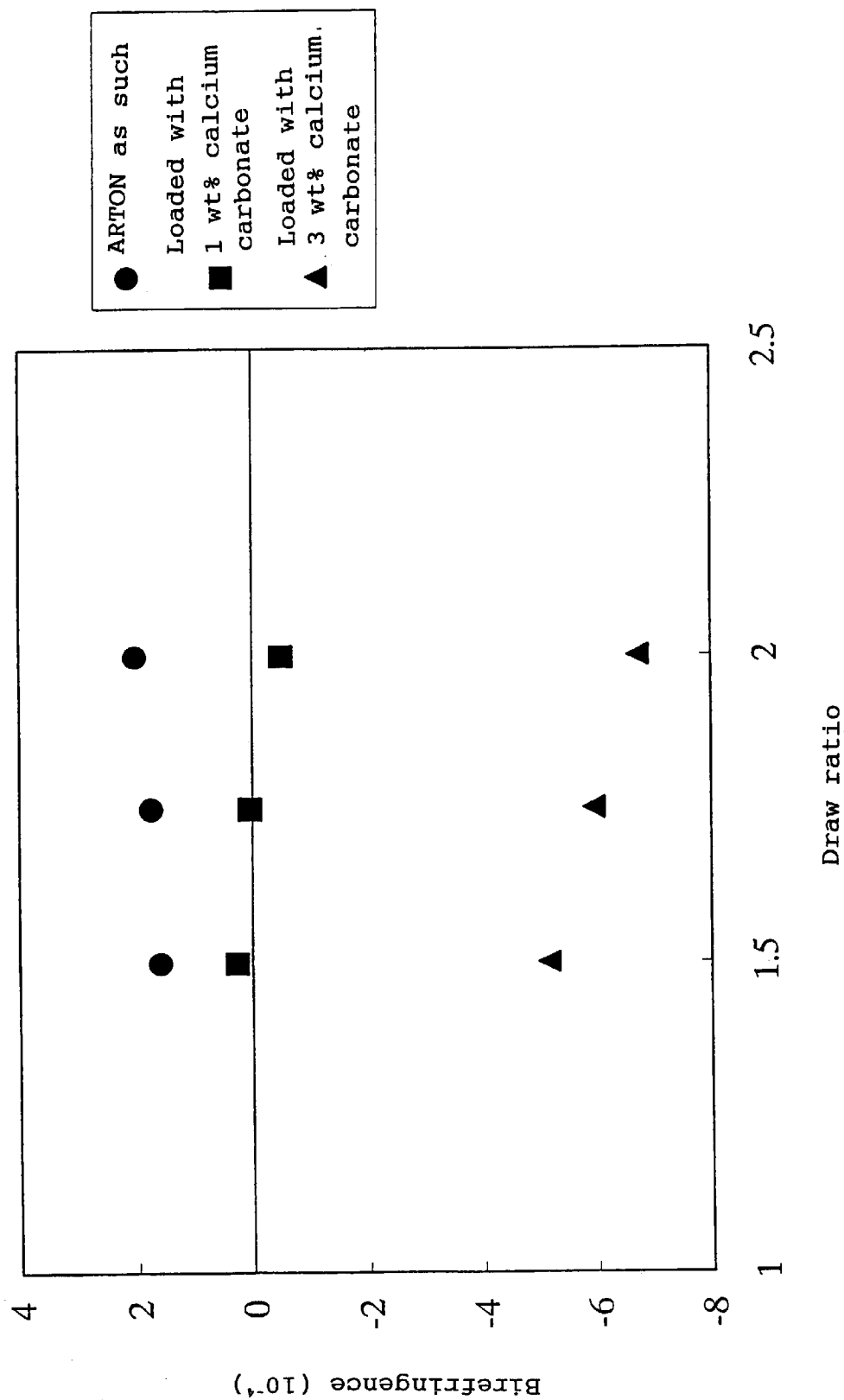
FIG. 4 is a graph showing the birefringence of drawn ARTON loaded with calcium carbonate vs. the draw ratio.

A glass sample tube was charged with tetrahydrofuran (Junsei Pure Chemical Co., Ltd.) and the fine acicular crystal particles of calcium carbonate (Maruo Calcium Co., Ltd.) and treated by sonication for about 10 minutes to form a uniform dispersion of the calcium carbonate. As a polymer, pellets of ARTON (JSR) were added and the mixture was shaken for about 24 hours to form a solution. To achieve more uniform dispersing, sonication was performed for an additional period of about 10 minutes; then, agitation and defoaming were performed with a stirrer HYBRID MIXER HM-500 (Manufactured by KEYENCE CORPORATION). The reagents were mixed at the following ratios: tetrahydrofuran was four times as heavy as ARTON and calcium carbonate was used in amounts of 1 wt % and 3 wt % of ARTON. A reference sample was prepared without using calcium carbonate. Each of the polymer solutions thus prepared was spread on a glass plate with a knife coater and left to stand in a container of low airtightness so that the solvent evaporated slowly. A film of the sample (about 50 μm thick) was stripped from the glass plate and vacuum dried in a desiccator for about 50 hours. The dried sample was stretched uniaxially with a Tensilon universal tester (ORIENTEC). The drawing temperature was 240° C., the draw speed was 4 mm/min and the draw ratio was 1.5, 1.75 and 2.0. The birefringence of the drawn samples was measured with an inclining automatic birefringence meter KOBRA-21ADH (Oji Keisoku Kiki). The results are shown in the following Table 2 and FIG. 4.

TABLE 2

Draw Ratio and Birefringence of ARTON Loaded with
Acicular Calcium Carbonate Crystals
Birefringence ($\times 10^{-4}$)

| Resin Draw ratio | ARTON as such | ARTON loaded with 1 wt % $CaCO_3$ | ARTON loaded with 3 wt % $CaCO_3$ |
|---|---|---|---|
| 1.5 | +1.6 | +0.27 | −5.1 |
| 1.75 | +1.8 | +0.046* | −5.9 |
| 2.0 | +2.0 | −0.49 | −6.7 |

* Average of two measurements

ARTON as such showed positive birefringence but this was cancelled out by adding 1 wt % of calcium carbonate which showed negative birefringence in orientation. When calcium carbonate was added in a higher concentration (3 wt %), the resin showed negative birefringence in orientation. This result shows that the birefringence in orientation of polymers can be cancelled out by adding calcium carbonate at appropriate concentrations.

Example 2

This example is intended to show that positive birefringence in orientation of a resin can be cancelled out by adding particles (acicular crystals of calcium carbonate) having negative birefringence and drawing the mixture to orient the crystals.

A glass sample tube was charged with dichloromethane (Tokyo Kasei Kogyo K.K.) and the fine acicular crystal particles of calcium carbonate (Maruo Calcium Co., Ltd.) and treated by sonication for about 10 minutes to form a uniform dispersion of the calcium carbonate. As a polymer, pellets of polycarbonate (MW=22,000) were added and the mixture was shaken for about 24 hours to form a solution. To achieve more uniform dispersing, sonication was performed for an additional period of about 10 minutes; then, agitation and defoaming were performed with a stirrer HYBRID MIXER HM-500 (Manufactured by Keenes K.K.). The reagents were mixed at the following ratios: dichloromethane was six times as heavy as polycarbonate and calcium carbonate was used in an amount of 3 wt % of polycarbonate. A reference sample was prepared without using calcium carbonate. Each of the polymer solutions thus prepared was spread on a glass plate with a knife coater and left to stand in a container of low airtightness so that the solvent evaporated slowly. A film of the sample (about 55 μm thick) was stripped from the glass plate and vacuum dried in a desiccator for about 50 hours. The dried sample was stretched uniaxially with a Tensilon universal tester (ORIENTEC). The drawing temperature was 190° C., the draw speed was 2.5 mm/min and the draw ratio was 1.5. The birefringence of the drawn samples was measured with an inclining automatic birefringence meter KOBRA-21ADH (Oji Keisoku Kiki). The results are shown in Table 3.

TABLE 3

Birefringence of Drawn Polycarbonate Films

| Sample | Birefringence |
|---|---|
| polycarbonate | $15.0 \times 10^{-4}$ |
| polycarbonate loaded with 3 wt % $CaCO_3$ | $8.0 \times 10^{-4}$ |

The polycarbonate as such exhibited positive birefringence of $15.0 \times 10^{-4}$ which almost decreased by half when 3 wt % of calcium carbonate was added.

Example 3

This example is intended as an actual demonstration of the fact that by stretching a resin loaded with acicular calcium carbonate crystals, the added acicular calcium carbonate crystals were oriented in the direction in which the resin was stretched. The example also shows that the resin stretching could induce changes in the birefringence in orientation of the resin. The example also serves as a proof of the fact that what occurred was not a simple apparent cancellation of the birefringence in orientation of the resin due to perturbation of the orientation of the polymer chains that was caused by addition of the acicular calcium carbonate crystals but that the added acicular calcium carbonate crystals were oriented in the resin to alter its birefringence in orientation.

Figure 5:
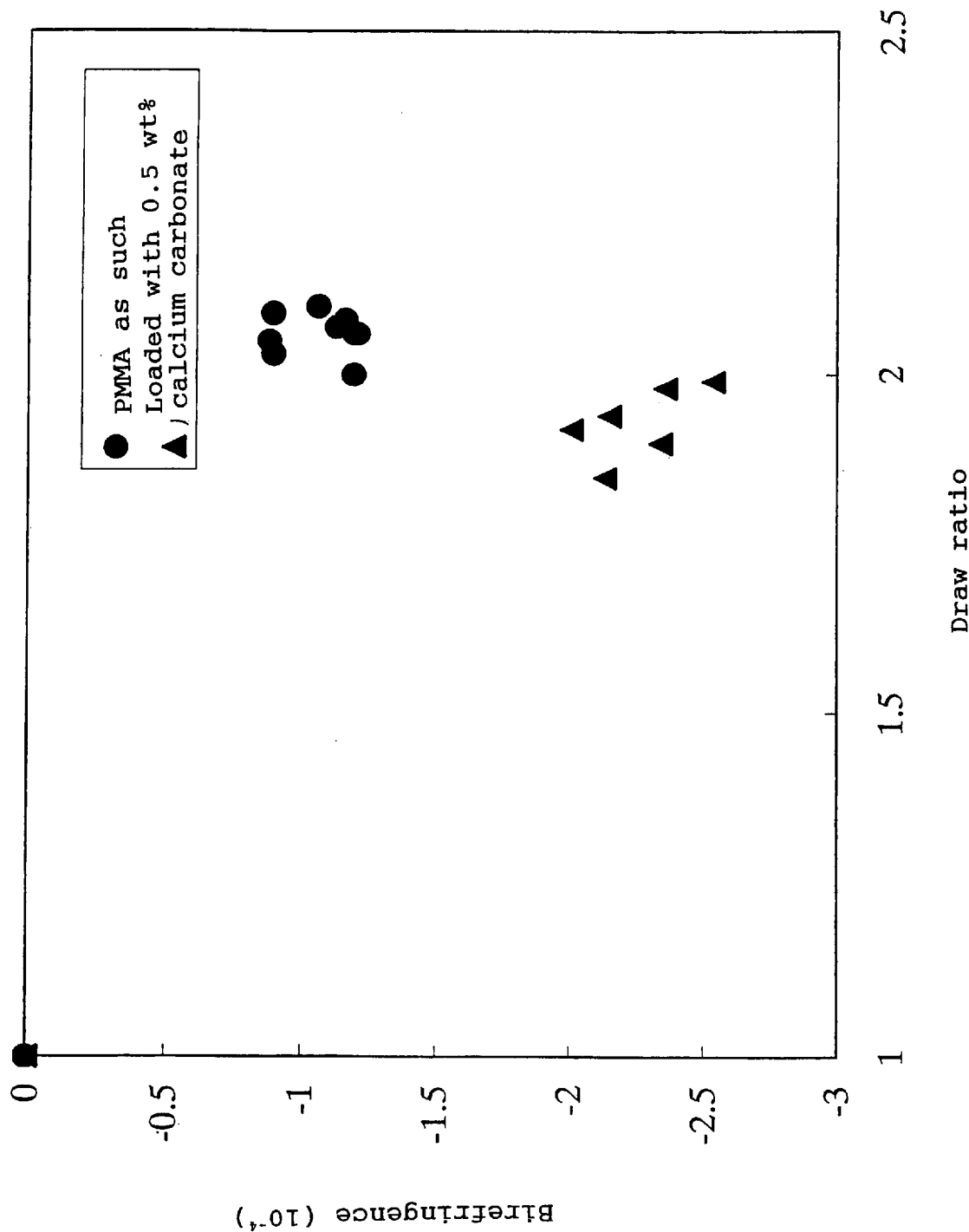
FIG. 5 is a graph showing the birefringence of drawn polymethyl methacrylate loaded with calcium carbonate vs. the draw ratio.

A glass sample tube was charged with ethyl acetate (Junsei Pure Chemical Co., Ltd.) and the fine acicular crystal particles of calcium carbonate (Maruo Calcium Co., Ltd.) and treated by sonication for about 10 minutes to form a uniform dispersion of the calcium carbonate. As a polymer, pellets of polymethyl methacrylate (PMMA; Wako Pure Chemical Industries, Ltd.) were added and the mixture was shaken for about 24 hours to form a solution. To achieve more uniform dispersing, sonication was performed for an additional period of about 10 minutes; then, agitation and defoaming were performed with a stirrer HYBRID MIXER HM-500 (Manufactured by Keenes K.K.). The reagents were mixed at the following ratios: ethyl acetate was four times as heavy as polymethyl methacrylate and calcium carbonate was used in an amount of 0.5 wt % of polymethyl methacrylate. A reference sample was prepared without using calcium carbonate. Each of the polymer solutions thus prepared was spread on a glass plate with a knife coater and left to stand in a container of low airtightness so that the solvent evaporated slowly. A film of the sample (about 50 µm thick) was stripped from the glass plate and vacuum dried in a desiccator for about 50 hours. The dried sample was stretched uniaxially with a Tensilon universal tester (ORIENTEC). The drawing temperature was 100° C., the draw speed was 4 mm/min and the draw ratio was 1.7-2.3. The birefringence of the drawn samples was measured with an inclining automatic birefringence meter KOBRA-21ADH (Oji Keisoku Kiki). The results are shown in FIG. 5.

Polymethyl methacrylate as such showed a negative birefringence of about $-1 \times 10^{-4}$. When it was mixed with 0.5 wt % calcium carbonate, the negative birefringence increased to values between about $-2 \times 10^{-4}$ and about $-2.5 \times 10^{-4}$. Comparing this fact with the results of Examples 1 and 2, one could confirm that the acicular crystals of calcium carbonate were capable of providing negative birefringence in orientation in each of the resins tested (ARTON, polycarbonate and polymethyl methacrylate). It was therefore proved that what occurred was not a simple apparent cancellation of the birefringence in orientation of the resin due to perturbation of the orientation of the polymer chains that was caused by addition of the acicular calcium carbonate crystals but that the added acicular calcium carbonate crystals were oriented in the direction of resin drawing, thus exhibiting the ability to provide negative birefringence in orientation.

Figure 6:
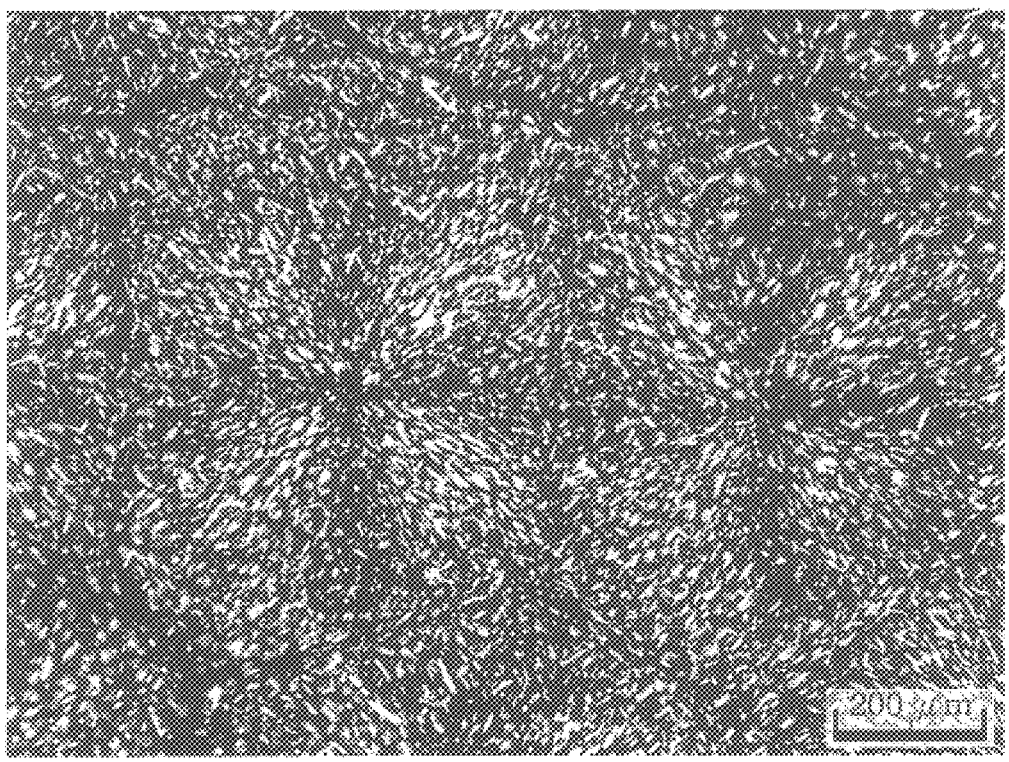
FIG. 6 is a micrograph showing how acicular crystal particles of calcium carbonate are oriented in a polymethyl methacrylate film (yet to be drawn)
Figure 7:
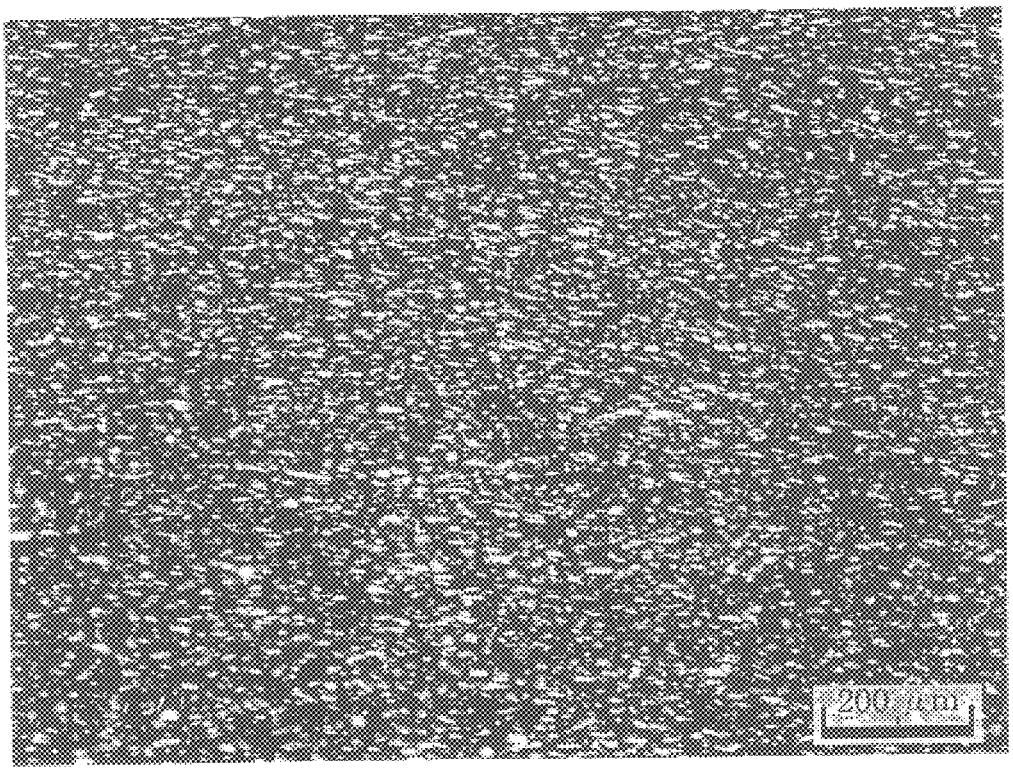
FIG. 7 is a micrograph showing how acicular crystal particles of calcium carbonate are oriented in a polymethyl methacrylate film (as drawn).

FIGS. 6 and 7 show the behavior of fine acicular calcium carbonate crystal particles in a polymethyl methacrylate film as observed under a microscope before the film was stretched (FIG. 6) or after it was stretched (FIG. 7). The direction of film drawing is from the right to left side of the picture. Obviously, prior to drawing, the calcium carbonate crystal particles were oriented parallel to the direction of convection that accompanied the evaporation of the solvent during the making of the polymer film but upon drawing, the crystal particles were oriented in the direction of drawing.

Example 4

This example shows that the inorganic substance added to cancel the birefringence in orientation of resins need not necessarily be in a single crystal form but may be composed of polycrystals.

A film prepared by copolymerizing methyl methacrylate and benzyl methacrylate in a weight ratio of 82:18 has been known to develop no birefringence in orientation at all even if it is oriented by drawing because its optical anisotropy has been cancelled out at a monomer level (see known references such as APPLIED OPTICS, Vol. 36, No. 19, pp. 4549–4555, 1997). If the proportion of methyl methacrylate is increased, negative birefringence in orientation develops but if the proportion of benzyl methacrylate is increased, positive birefringence in orientation develops.

A glass test tube was charged with methyl methacrylate (Wako Pure Chemical Industries, Ltd.) and benzyl methacrylate (Tokyo Kasei Kogyo K.K.) in a weight ratio of 84:16; after adding 0.5 wt % of benzoyl peroxide (Nacalai Tesque, Inc.) as an initiator and 0.2 wt % of normal butyl mercaptan (Wako Pure Chemical Industries, Ltd.) as a chain transfer agent, the mixture was heated at 70° C. for 24 hours to effect polymerization. To purify it, the resulting polymer was put into 10 volumes of ethyl acetate and dissolved. The polymer solution was added dropwise to a great excess of methanol so as to precipitate the polymer. The polymer was separated by filtration and the solvent was completely evaporated by vacuum drying in a desiccator for about 100 hours, thus yielding a polymer of increased purity.

In the next step, polycrystals of calcium carbonate were prepared which differed from the acicular crystals used in Examples 1–3. The prepared polycrystals of calcium carbonate had an average particle size of 500 nm (Ube Material Industries, Ltd.) and were polycrystalline particles which were aggregates of single crystals. From the statistic direction of the individual internal constituent single crystals, it was suggested that the polycrystals of calcium carbonate used in Example 4 were "the fine particles having positive birefringence" within the definition of the term given herein. In order to verify this possibility, analysis was made on films that were prepared by the following method.

The purified polymer (see above) was first dried, then added to ethyl acetate and shaken with a shaker to prepare a uniform polymer solution having a concentration of about 15 wt %. The solution was divided into two portions and the above-mentioned polycrystals of calcium carbonate were added to one portion at a concentration of 0.5 wt % and the mixture was agitated to uniformity. The two polymer solutions were each spread on a level glass plate with a knife coater and left to stand under a cover so that the solvent evaporated slowly. Films of the sample (about 100 µm thick) were stripped from the glass plate and vacuum dried in a desiccator for about 50 hours.

The prepared polymer films were set on a Tensilon universal tester RTC-1210A (product of A & D K.K.) and stretched by a draw ratio of 2 at a constant speed of 6 mm/min at a temperature of 90° C. The samples were oriented as the result of drawing and their birefringence was measured by a crossed sensitive color plate method using a Toshiba precision strain meter SVP-30-II (product of Toshiba Glass Co., Ltd.) The results are shown in Table 4.

TABLE 4

Birefringence of Drawn Copolymer Films

| Sample | Birefringence ($\times 10^{-5}$) |
|---|---|
| polymer as such (consisting of methyl methacrylate and benzyl methacrylate at 84:16) | -1.07 |
| polymer loaded with 0.5 wt % calcium carbonate | 0.00 |

The polymer as such contained more methyl methacrylate than it was in the formulation capable of cancelling out birefringence in orientation, so it developed negative birefringence in orientation. On the other hand, the polymer film loaded with 0.5 wt % of the polycrystals of calcium carbonate had the birefringence in orientation cancelled out. It was therefore clear that when the polycrystals of calcium carbonate used in Example 4 were added to a resin having negative birefringence in orientation, they could cancel out the resin's birefringence in orientation by imparting positive birefringence in orientation.

From the result of Example 4, one can see that even with an inorganic substance such as calcium carbonate whose single crystals have inherently negative birefringence, fine particles that show birefringence of either sign, positive or negative, can be prepared by changing the morphology of the crystals to various shapes. In other words, it was suggested that the birefringence in orientation of all kinds of resins could be cancelled out by preparing various fine crystal particles in accordance with the sign of birefringence in orientation of the resin to be used, the magnitude of its absolute value, and other factors.

What is claimed is:

1. An optical resin material comprising a transparent high molecular weight resin and a fine inorganic substance which, as the linked chains in the high molecular weight resin are oriented under an external force, is oriented in the same direction as the linked chains and which has birefringence, the birefringence of said inorganic substance cancelling out the birefringence in orientation of the oriented high molecular weight resin.

2. The optical resin material according to claim 1, wherein the inorganic substance is a mineral or a ceramic.

3. The optical resin material according to claim 1, wherein the inorganic substance is calcium carbonate.

4. The optical resin material according to any one of claims 1–3, wherein the inorganic substance subjected to a preliminary surface treatment with a binder highly dispersible in the high molecular weight resin is employed.

5. A process for producing the optical resin material according to any one of claims 1–3, which includes the step of adding the inorganic substance either prior to the start of polymerization reaction for synthesizing the high molecular weight resin or after the start of the polymerization reaction but before it ends.

6. A process for producing the optical resin material according to any one of claims 1–3, which includes the step of kneading the inorganic substance into a high molecular weight resin material.

7. An optical component using the optical resin material according to any one of claims 1–3.

8. Equipment using the optical component according to claim 7 as an optical element.

9. An adhesive for permanent fixing for use in joining optical components, which uses the optical resin material according to any one of claims 1–3.

10. A substrate for a liquid-crystal device placed between a liquid-crystal layer and a polarizing plate, which is formed of the optical resin material according to any one of claims 1–3.

11. A polarizing plate for a liquid-crystal device formed by joining transparent resin sheets to both sides of a polarizer, said transparent resin sheet being made of the optical resin material according to any one of claims 1–3.

12. An adhesive for permanent fixing for use in joining elements of a liquid-crystal device, which uses the optical resin material according to any one of claims 1–3.

13. A process for producing the optical resin material according to claim 4, which includes the step of adding the inorganic substance either prior to the start of polymerization reaction for synthesizing the high molecular weight resin or after the start of the polymerization reaction but before it ends.

14. A process for producing the optical resin material according to claim 4, which includes the step of kneading the inorganic substance into a high molecular weight resin material.

15. An optical component using the optical resin material according to claim 4.

16. Equipment using the optical component according to claim 15 as an optical element.

17. An adhesive for permanent fixing for use in joining optical components, which uses the optical resin material according to claim 4.

18. A substrate for a liquid-crystal device placed between a liquid-crystal layer and a polarizing plate, which is formed of the optical resin material according to claim 4.

19. A polarizing plate for a liquid-crystal device formed by joining transparent resin sheets to both sides of a polarizer, said transparent resin sheet being made of the optical resin material according to claim 4.

20. An adhesive for permanent fixing for use in joining elements of a liquid-crystal device, which uses the optical resin material according to claim 4.

21. The optical resin material according to claim 1, wherein the inorganic substance comprises particles having an elongated shape.

22. The optical resin material according to claim 21, wherein the particles have an acicular, cylindrical, plate, columnar or ellipsoidal shape.

23. The optical resin material according to claim 22, wherein the particles have an acicular shape.

24. The optical resin material according to claim 22, wherein the particles have a cylindrical shape.

25. The optical resin material according to claim 22, wherein the particles have a plate shape.

26. The optical resin material according to claim 22, wherein the particles have a columnar shape.

27. The optical resin material according to claim 22, wherein the particles have an ellipsoidal shape.

28. The optical resin material according to claim 1, wherein the birefringence in orientation of the high molecular weight resin is positive and the birefringence of the inorganic substance is negative.

29. The optical resin material according to claim 1, wherein the birefringence in orientation of the high molecular weight resin is negative and the birefringence of the inorganic substance is positive.

30. The optical resin material according to claim 1, wherein the optical resin material is transparent.

31. The optical resin material according to claim 1, wherein the particles of the inorganic substance are dispersed in a matrix of the high molecular weight resin.

* * * * *